US010035726B2

(12) United States Patent
Ando et al.

(10) Patent No.: US 10,035,726 B2
(45) Date of Patent: Jul. 31, 2018

(54) GRANULES, METHOD FOR THEIR PRODUCTION, AND METHOD FOR PRODUCING GLASS PRODUCT

(71) Applicant: Asahi Glass Company, Limited, Chiyoda-ku (JP)

(72) Inventors: Ryota Ando, Chiyoda-ku (JP); Noriko Nishina, Chiyoda-ku (JP)

(73) Assignee: Asahi Glass Company, Limited, Chiyoda-ku (JP)

( * ) Notice: Subject to any disclaimer, the term of this patent is extended or adjusted under 35 U.S.C. 154(b) by 48 days.

(21) Appl. No.: 15/054,478

(22) Filed: Feb. 26, 2016

(65) Prior Publication Data
US 2016/0168011 A1 Jun. 16, 2016

Related U.S. Application Data
(63) Continuation of application No. PCT/JP2014/073036, filed on Sep. 2, 2014.

(30) Foreign Application Priority Data
Sep. 5, 2013 (JP) .................................. 2013-184369

(51) Int. Cl.
| C03C 3/087 | (2006.01) |
| C03B 1/02 | (2006.01) |
| C03C 1/02 | (2006.01) |
| C03C 3/091 | (2006.01) |
| C04B 18/02 | (2006.01) |

(52) U.S. Cl.
CPC ................. *C03C 3/087* (2013.01); *C03B 1/02* (2013.01); *C03C 1/026* (2013.01); *C03C 3/091* (2013.01); *C04B 18/021* (2013.01)

(58) Field of Classification Search
CPC ......... C03C 1/026; C03C 3/087; C03C 3/091; C03B 1/02; C04B 7/32; C04B 14/06; C04B 18/021; C04B 22/06; C04B 28/06
See application file for complete search history.

(56) References Cited

U.S. PATENT DOCUMENTS
| 8,919,151 | B2 | 12/2014 | Shinohara |
| 9,216,922 | B2 | 12/2015 | Ando et al. |
| 2001/0016550 | A1 | 8/2001 | Tomaino et al. |
| 2003/0052434 | A1 | 3/2003 | Hockman et al. |
| 2014/0083139 | A1 | 3/2014 | Ando et al. |

FOREIGN PATENT DOCUMENTS
| CN | 1537076 A | 10/2004 |
| JP | 47-23404 | 10/1972 |
| JP | 48-79816 | 10/1973 |
| JP | 49-19130 | 2/1974 |
| JP | 49-28648 | 7/1974 |
| JP | 64-51333 | 2/1989 |
| WO | WO 97/25285 A1 | 7/1997 |
| WO | WO 2012/039327 A1 | 3/2012 |
| WO | WO 2012/161273 A1 | 11/2012 |
| WO | WO 2013/012040 A1 | 1/2013 |

OTHER PUBLICATIONS
English Translation of International Search Report dated Nov. 25, 2014 in PCT/JP2014/073036, filed Sep. 2, 2014.
U.S. Appl. No. 13/399,014, filed Feb. 17, 2012, 2012/0144863 A1, Nobuhiro Shinohara et al.
U.S. Appl. No. 14/088,851, filed Nov. 25, 2013, 2014/0075995 A1, Ryota Ando et al.
"Secar®71", Product Data Sheet.

*Primary Examiner* — Elizabeth A. Bolden
(74) *Attorney, Agent, or Firm* — Oblon, McClelland, Maier & Neustadt, L.L.P.

(57) ABSTRACT

To provide a method for producing granules as glass raw material without using a binder that contains an alkali metal or boron. In the method, granules are produced by mixing a glass raw material composition and water. A method for producing granules to be used for the production of alkali-free glass, which comprises mixing a glass raw material composition and water, wherein the glass raw material composition essentially comprises an aluminum source containing calcium aluminate represented by $CaO.2Al_2O_3$, a calcium source containing one or both of calcium oxide and calcium hydroxide, and a silicon source.

15 Claims, 3 Drawing Sheets

GRANULES, METHOD FOR THEIR PRODUCTION, AND METHOD FOR PRODUCING GLASS PRODUCT

TECHNICAL FIELD

The present invention relates to granules to be used for the production of alkali-free glass, a method for their production, and a method for producing a glass product using the granules.

BACKGROUND ART

For glass substrates for various displays, alkali-free glass containing substantially no alkali metal component is required. Alkali-free glass to be used for a display substrate, is usually required to be melted at a high temperature as compared with common soda-lime glass. This is because silica raw material having a high melting point is used in a large amount, or an alkali component having a function to accelerate melting of silica raw material is not used.

Further, a glass substrate for display is required to have a high quality such that it does not have defects influential over display presentation, such as bubbles, striae, non-molten substances, pits, flaws, etc., inside or on the surface of the glass substrate. However, in alkali-free glass to be used for a display substrate, homogeneity in the glass composition tends to be low as compared with common soda-lime glass. In order to obtain glass having high homogeneity in the glass composition, it is effective to finely pulverize glass raw material not to let non-molten raw material remain. However, in the case of using finely pulverized glass raw material, at the time of putting the raw material into a glass melting furnace, the raw material is likely to scatter, whereby there may be such a problem that the glass composition tends to be unstable, or a part of the glass raw material is wasted.

As a method to solve the problem of scattering of finely pulverized glass raw material, a method is known wherein the glass raw material is granulated into granules for use. For example, Patent Document 1 discloses a method for producing granules by using caustic soda or water glass as a binder. Patent Document 2 discloses a method for producing granules by using boric acid as a binder.

Example 1, etc. in Patent Document 3 discloses a method wherein water is added to a mixture containing Portland cement or alumina cement as the main component, followed by kneading and forming into a suitable size and then sintering at from 900 to 1,100° C. to obtain a sintered solid.

Patent Document 3 discloses that alumina cement is used as the glass raw material, and the alumina cement has a composition comprising from 3 to 6 mass % of $SiO_2$, from 49 to 57 mass % of $Al_2O_3$, from 0.3 to 3 mass % of $Fe_2O_3$, from 35 to 40 mass % of CaO and from 0 to 1 mass % of MgO. The alumina cement having this composition contains $CaO.Al_2O_3$ as the main component and does not contain $CaO.2Al_2O_3$.

PRIOR ART DOCUMENTS

Patent Documents

Patent Document 1: JP-A-64-51333
Patent Document 2: WO2012/039327
Patent Document 3: JP-A-49-19130

DISCLOSURE OF INVENTION

Technical Problem

In the case of granulating raw material for alkali-free glass, it is not possible to use caustic soda or water glass containing an alkali metal, as a binder, and therefore, it is difficult to obtain hardly breakable strong granules.

Recently characteristics required for glass substrates for various displays are diversified, and alkali-free glass which contains substantially no boron oxide ($B_2O_3$) has been required. However, in the case of granulating raw material for glass not containing boron oxide, or for glass containing little amount of boron oxide, it is not possible to utilize boric acid as a binder, and therefore, it is difficult to obtain hardly breakable strong granules.

In the method disclosed in Patent Document 3, there is a step of sintering glass raw material, whereby the method becomes cumbersome, and energy consumption tends to be large.

Further, the present inventors have tried to granulate glass raw material containing alumina cement, but it has been difficult to form hardly breakable strong granules.

The present invention is an invention to solve the above problem and to provide a method for producing granules to be used for the production of alkali-free glass.

Solution to Problem

The present inventors have conducted a study by paying attention to the point that the curing rate is different depending upon the chemical composition of alumina cement, and as a result, have accomplished the following invention, whereby it is possible to form hardly breakable strong granules.

[1] A method for producing granules to be used for the production of alkali-free glass, which comprises mixing a glass raw material composition and water, wherein the glass raw material composition essentially comprises one or both of calcium oxide and calcium hydroxide, $CaO.2Al_2O_3$, and a silicon source.

[2] The method for producing granules according to [1], wherein the glass raw material composition contains $CaO.Al_2O_3$.

[3] The method for producing granules according to [1] or [2], wherein the glass raw material composition contains, as a refining agent or a color tone adjuster, one or both of a sulfate component and a nitrate component.

[4] The method for producing granules according to any one of [1] to [3], wherein the glass raw material composition contains alumina cement containing $CaO.2Al_2O_3$, and the alumina cement contains an aluminum source in an amount of at least 65 mass % as calculated as $Al_2O_3$, based on 100 mass % of the alumina cement.

[5] The method for producing granules according to [4], wherein the alumina cement is such that the total amount of $CaO.2Al_2O_3$ and $CaO.Al_2O_3$ to 100 mass % of calcium aluminate contained in the alumina cement, is from 80 to 100 mass %, and the quantity ratio of $CaO.2Al_2O_3$ and $CaO.Al_2O_3$ in the alumina cement is such that $CaO.2Al_2O_3$ to 100 mass % in total of $CaO.2Al_2O_3$ and $CaO.Al_2O_3$ is at least 2 mass % and at most 100 mass %.

[6] The method for producing granules according to [4], wherein the glass raw material composition is granulated by adding and mixing one or both of calcium oxide and calcium hydroxide, and a silicon source, to a hydrate of the alumina cement.

[7] The method for producing granules according to any one of [1] to [6], wherein in the step of mixing the glass raw material composition and water, after hardening while mixing the glass material composition and water, granules are obtained at a temperature of at most 800° C.

[8] The method for producing granules according to any one of [1] to [7], wherein in the glass raw material composition, the total amount of calcium oxide and calcium hydroxide is from 0.1 to 10 mass %, based on 100 mass % of the glass raw material composition.

[9] The method for producing granules according to any one of [1] to [8], wherein the glass raw material composition contains substantially no boron oxide or boric acid, or contains one or both of boron oxide and boric acid and the total amount of boron oxide and boric acid is more than 0 mass % and at most 3 mass %, based on 100 mass % of the glass raw material composition.

[10] The method for producing granules according to any one of [1] to [9], wherein the glass raw material composition comprises, as calculated as oxides based on 100 mass % of alkali-free glass obtainable from the granules, from 40 to 85 mass % of $SiO_2$, from 5 to 30 mass % of $Al_2O_3$, from 0 to 18 mass % of MgO and from 2 to 40 mass % of CaO.

[11] A method for producing a glass product, which comprises obtaining granules by the method as defined in any one of [1] to [10], heating the granules to obtain a glass melt, and forming and annealing the glass melt, to obtain a glass product.

[12] Granules to be used for the production of a glass product made of alkali-free glass, which essentially comprise a silicon source and $3CaO \cdot Al_2O_3 \cdot 6H_2O$.

[13] The granules according to [12], which comprise, as calculated as oxides based on 100 mass % of alkali-free glass obtainable from the granules, from 40 to 85 mass % of $SiO_2$, from 5 to 30 mass % of $Al_2O_3$, from 0 to 18 mass % of MgO and from 2 to 40 mass % of CaO.

[14] A method for producing a glass product, which comprises heating the granules as defined in [12] or [13] to obtain a glass melt, and forming and annealing the glass melt, to obtain a glass product.

[15] The method for producing a glass product according to [11] or [14], wherein the glass product comprises, as calculated as oxides based on 100 mass % of the glass product, from 40 to 85 mass % of $SiO_2$, from 5 to 30 mass % of $Al_2O_3$, from 0 to 18 mass % of MgO and from 2 to 40 mass % of CaO.

Advantageous Effects of Invention

According to the method for producing granules of the present invention, it is possible to produce granules for the production of hardly breakable strong alkali-free glass.

The granules of the present invention can be used in the production of alkali-free glass.

According to the method for producing a glass product of the present invention, by using the granules of the present invention, it is possible to obtain a glass product of alkali-free glass having good homogeneity in the glass composition.

DESCRIPTION OF EMBODIMENTS

In this specification, components of glass are represented by oxides such as $SiO_2$, $Al_2O_3$, CaO, etc. and the contents of the respective components to the entire glass (glass composition) are represented by mass percentages based on oxides.

In this specification, "glass raw material" is a component to constitute raw material for glass, and "glass raw material composition" is a composition comprising a plurality of components to constitute glass raw material. The glass raw material may, for example, be an oxide or a composite oxide, or a compound capable of becoming an oxide by thermal decomposition. The compound capable of becoming an oxide by thermal decomposition may, for example, be a hydroxide, a carbonate, a nitrate, a halide or the like.

In this specification, "granules" are ones obtained by granulating a glass raw material composition, and basically a single granule contains all components required for the production of glass. For example, granules are such that when a single granule is heated, melted and thereby vitrified, it is possible to obtain glass having a glass composition intended to be obtained.

In this specification, "100 mass % of alkali-free glass obtainable from the granules" as used for the entire amount of the composition, is meant for the entire mass of one (alkali-free glass) formed by solidification of a glass melt obtained by melting the granules, in a case where, as components capable of becoming raw material for glass, no components other than the granules of the present invention are used. Here, in a case where no components other than the granules of the present invention are used as components capable of becoming raw material for glass, in a series of steps for producing a glass product by melting granules, forming, annealing (solidifying) and post processing, the glass composition (the composition of components capable of becoming raw material for glass) in the product of each step is equal to one another. However, components to be processed on the surface of the glass product by e.g. surface treatment in the post-processing step shall not be included in the composition of the glass product (in the glass composition).

In this specification, the "average particle size" is a 50% diameter (D50) in the cumulative fraction, unless otherwise specified. In a case where D50 is at most 1 mm, the 50% diameter in the volume-based cumulative fraction measured by using a laser diffraction method is taken as D50. In a case where D50 exceeds 1 mm, the 50% diameter of the weight cumulative total measured by a method (sieving method) for determining the average particle diameter by classification by means of sieves is taken as D50. As the particle diameter measuring method by a laser diffraction method, the method described in JIS Z8825-1 (2001) is used.

In this specification, "to" indicating a numerical value range is used in such a sense that it includes the numerical values described before and after it as the lower limit value and the upper limit value, respectively.

Now, the method for producing granules and the method for producing a glass product of the present invention will be described with reference to the respective embodiments.

«Method for Producing Granules»

The method for producing granules of the present invention is a method for producing granules, which comprises mixing a glass raw material composition and water.

The amount of water to be mixed, is preferably from 5 to 30 mass %, more preferably from 10 to 26 mass %, further preferably from 15 to 25 mass %, by outer percentage, to 100 mass % of the glass raw material composition. If the amount of water to the glass raw material composition is deficient, it becomes difficult to obtain strong granules. If the amount of water to the glass raw material composition is excessive, granules tend to adhere to the surface of an apparatus such as a mixer, during the granulation.

<Glass Raw Material Composition>

In the present invention, the glass raw material composition essentially comprises one or both of calcium oxide and calcium hydroxide, an aluminum source, and a silicon source, and the aluminum source contains at least $CaO.2Al_2O_3$.

[Calcium Oxide and Calcium Hydroxide]

The glass raw material composition of the present invention essentially contains one or both of calcium oxide and calcium hydroxide.

When the glass raw material composition contains calcium oxide or calcium hydroxide, a gel-like calcium hydrate may be formed when water is added to the glass raw material composition. The gel-like calcium hydrate acts as a binder for granules.

If the amount of calcium oxide and calcium hydroxide is too small, it becomes difficult to obtain strong granules. Further, it may not be contained beyond the range wherein a desired glass composition can be obtained. Accordingly, the total amount of calcium oxide and calcium hydroxide is preferably from 0.1 to 10 mass %, more preferably from 0.2 to 6 mass %, to 100 mass % of the glass raw material composition.

[Aluminum Source]

($CaO.2Al_2O_3$)

The glass raw material composition of the present invention contains $CaO.2Al_2O_3$ (hereinafter may be referred to as $CA_2$) as an essential component. $CA_2$ is preferably a powder.

In the present invention, as the glass raw material composition contains $CA_2$, strong granules are obtainable. This is considered to be attributable to that the curing rate when $CA_2$ is cured in contact with water, is not too fast or too slow, relative to the rate for granulation by mixing the glass raw material composition and water.

When water is added, $CA_2$ may form a gel-like hydrate. The gel-like hydrate acts as a binder for granules. In the present invention, the glass raw material composition contains $CA_2$ and at least one of calcium oxide and calcium hydroxide, whereby hardly breakable strong granules will be formed. Even if the glass raw material composition contains $CA_2$, if it does not contain both of calcium oxide and calcium hydroxide, it is difficult to obtain strong granules. Further, even if the glass raw material composition contains calcium oxide or calcium hydroxide, if it does not contain $CA_2$, it is difficult to obtain strong granules.

One of the reasons is considered to be that when calcium oxide or calcium hydroxide is present in the glass raw material composition containing $CA_2$, curing of $CA_2$ is accelerated more than as expected, when the glass raw material composition is mixed with water.

$CA_2$ is one type of substance known as calcium aluminate. The calcium aluminate includes, in addition to $CA_2$, those represented by the following formulae (CA), ($C_{12}A_7$) and ($C_3A$). Hereinafter, the calcium aluminate represented by the formula (CA) may be referred to simply as CA. The same applies to calcium aluminates represented by other formulae.

$$CaO.Al_2O_3 \quad (CA)$$

$$12CaO.7Al_2O_3 \quad (C_{12}A_7)$$

$$3CaO.Al_2O_3 \quad (C_3A)$$

The glass raw material composition may contain a calcium aluminate other than $CA_2$. Further, the glass raw material composition preferably contains CA in addition to $CA_2$, whereby it is possible to readily obtain a proper curing rate during the granulation step. On the other hand, the glass raw material composition should better not to contain $C_3A$ and $C_{12}A_7$, or if contains, only a small amount of them, because otherwise the curing speed tends to be too fast relative to the rate at which granules are formed.

In a glass raw material composition in one embodiment of the present invention, it is preferred to incorporate alumina cement containing $CA_2$. The alumina cement contains an aluminum source in an amount of preferably at least 65 mass %, more preferably at least 70 mass %, and preferably at most 90 mass %, more preferably at most 85 mass %, as calculated as $Al_2O_3$, to 100 mass % of the alumina cement. With the alumina cement containing an aluminum source in such a range, it is readily possible to obtain a proper curing rate to form granules. The aluminum source to be contained in the alumina cement is, for example, calcium aluminate.

Further, alumina cement having an $Al_2O_3$ content of at least 65 mass % usually contains CA and $CA_2$ and substantially no $C_3A$ or $C_{12}A_7$. Alumina cement having an $Al_2O_3$ content exceeding 90 mass % usually does not contain CA and contains $CaO.6Al_2O_3$ (sometimes referred to as $CA_6$).

The total amount of CA and $CA_2$ to 100 mass % of calcium aluminate contained in alumina cement, is preferably from 80 to 100 mass %, more preferably from 90 to 100 mass %, most preferably 100 mass % (i.e. alumina cement consisting of CA and $CA_2$ is used as the alumina cement), whereby it is readily possible to obtain a proper curing rate to form granules.

The amount ratio of $CA_2$ and CA in the alumina cement is such that based on 100 mass % of the total amount of $CA_2$ and CA, $CA_2$ is preferably at least 2 mass % and at most 100 mass %, more preferably from 40 to 60 mass %. When the amount ratio of $CA_2$ and CA is within the above range, a sufficient binding force is readily obtainable in the granulation step.

The alumina cement may contain components other than the calcium aluminate, for example, oxides such as $SiO_2$, $Fe_2O_3$, $TiO_2$, MgO, etc. The content of such other components is usually at most 10 mass %, preferably at most 5 mass %, based on 100 mass % of the alumina cement.

When the glass raw material composition contains alumina cement containing $CA_2$, the content of the alumina cement containing $CA_2$ is preferably from 1 to 20 mass %, more preferably from 1.5 to 15 mass %, based on 100 mass % of the glass raw material composition. When the content of the alumina cement is within the above range, hardly breakable strong granules are obtainable.

In a case where a preliminary hydration step as described later is not carried out, in particular, the content of the alumina cement is preferably from 5 to 15 mass %, more preferably from 7 to 14 mass %, based on 100 mass % of the glass raw material composition.

In a case where a preliminary hydration step as described later is carried out, in particular, the content of alumina cement containing $CA_2$ is preferably within a range of from 1 to 12 mass %, based on 100 mass % of the glass raw material composition.

The glass raw material composition may also contain an aluminum source such as aluminum oxide in addition to calcium aluminate.

When the glass raw material composition contains aluminum oxide, the content of aluminum oxide in the glass raw material composition is preferably adjusted so that the desired glass composition is obtainable, in consideration of the compositions and amounts of the calcium aluminate and the alumina cement.

[Silicon Source]

The silicon source is preferably in a powder form from the viewpoint of handling efficiency and is more preferably silica. As a silicon source other than silica, anorthite or the like may be used. Silica is preferably silica sand from the viewpoint of availability. As silica other than silica sand, quartz, cristobalite, amorphous silica or the like may be used, and two or more of them may be suitably mixed for use.

The content of the silicon source in the glass raw material composition is preferably from 40 to 85 mass %, more preferably from 40 to 60 mass %, as calculated as $SiO_2$, based on 100 mass % of the glass raw material composition. When the content of the silicon source is within the above range, it is easy to maintain the shape of granules.

[Other Components to be Incorporated in Glass Raw Material Composition]

The glass raw material composition may contain other components. Such other components may, for example, be a magnesium source, a refining agent, a color tone adjuster (colorant), etc. Other components are preferably in a powder form. The glass raw material composition may contain nitric acid, sulfuric acid, hydrochloric acid, phosphoric acid, ammonia, etc.

The glass raw material composition may further contain other calcium sources. Other calcium sources include calcium carbonate, dolomite, etc. Dolomite is a mineral consisting of a carbonate of calcium and magnesium (ideal chemical composition: $CaO.MgO.2CO_2$) and is widely used as glass raw material. The amount of other calcium sources in the glass raw material composition is preferably from 0 to 30 mass %, as calculated as CaO, based on 100 mass % of alkali-free glass obtainable from the granules.

The amount of the magnesium source in the glass raw material composition is preferably from 0 to 18 mass %, as calculated as MgO, based on 100 mass % of alkali-free glass obtainable from the granules.

The magnesium source more preferably essentially contains at least one member selected from magnesium oxide and magnesium hydroxide and even more preferably further contains at least one member selected from magnesium chloride and magnesium sulfate. When the glass raw material composition contains these magnesium sources, strong granules are easily obtainable. The total amount of the magnesium sources in the glass raw material composition is preferably from 0.1 to 18 mass % and more preferably from 2 to 18 mass %, as calculated as MgO, based on 100 mass % of alkali-free glass obtainable from the granules.

The glass raw material composition may further contain a strontium source, a barium source, or a component to constitute a refining agent or a color tone adjuster.

The strontium source is a compound that may become SrO in the process for producing glass, and specific examples include strontium carbonate, strontium chloride, etc.

The barium source is a compound that may become BaO in the process for producing glass. Specific examples include barium carbonate, barium chloride, etc. These may be used alone, or in combination of two or more of them.

The component to constitute a refining agent or a color tone adjuster, may, for example, be a chloride such as magnesium chloride, calcium chloride or strontium chloride, a sulfate such as magnesium sulfate or calcium sulfate, a nitrate such as magnesium nitrate or calcium nitrate, or a component such as fluorite ($CaF_2$) or red iron ($Fe_2O_3$). These may be used alone or in combination of two or more of them.

As the component to constitute a refining agent or a color tone adjuster, it is preferred to use of one or both of a sulfate component and a nitrate component, since curing of the calcium aluminate is thereby promoted. The amount of the sulfate component and the nitrate component is preferably from 0.1 to 2.0 mass %, more preferably from 0.5 to 1.0 mass %, based on 100 mass % of alkali-free glass obtainable from the granules.

The above chloride component and sulfate component are preferably powders. The powders of magnesium sulfate, magnesium nitrate, etc. have high solubility in water, and will be dissolved or micronized when mixed with water, and therefore, D50 of these powders is not particularly limited.

[Composition of Glass Raw Material Composition]

The composition of the glass raw material composition is adjusted to be substantially the same as the composition of the desired glass product as calculated as oxides, with the exception of components which are easily volatilized in a glass melting step.

Glass to be produced from granules in one embodiment of the present invention is preferably alkali-free glass containing substantially no alkali metal oxides such as $Na_2O$, $Li_2O$, $K_2O$, etc. Containing substantially no alkali metal oxides, means that the total amount of alkali metal oxides is at most 0.1 mass %, particularly preferably at most 0.02 mass %, based on 100 mass % of alkali-free glass.

The composition of the glass raw material composition is preferably formulated to comprise from 40 to 85 mass % of $SiO_2$, from 5 to 30 mass % of $Al_2O_3$, from 0 to 18 mass % of MgO and from 2 to 40 mass % of CaO, as calculated as oxides based on 100 mass % of alkali-free glass obtainable from the granules. The glass raw material composition may further contain a small amount of non-metal oxides (sulfur oxides, etc.), halogens, etc. The total amount of non-metal oxides and halogens is preferably from 0 to 5 mass % based on 100 mass % of alkali-free glass obtainable from the granules. Sulfur oxides and halogens are so easily volatilized in the glass melting step, and therefore, they are preferably incorporated in a sufficient amount in the glass composition in consideration of the melting conditions, etc.

In a case where boron oxide ($B_2O_3$) is to be contained in the desired glass, it is preferred to add a larger amount of boric acid or the like in consideration of the volatilization in the melting step. Even in a case where $B_2O_3$ is not contained in the desired glass, boric acid may be contained in the glass raw material.

The composition of the glass raw material composition is preferably formulated so that it contains from 2 to 18 mass % of CaO and at least one of SrO and BaO, and the total amount of CaO, SrO and BaO will be from 2 to 40 mass %, as calculated as oxides based on 100 mass % of alkali-free glass obtainable from the granules.

The composition of the glass raw material composition is more preferably formulated so that it contains from 45 to 65 mass % of $SiO_2$, from 10 to 25 mass % of $Al_2O_3$, from 2 to 18 mass % of MgO and from 2 to 18 mass % of CaO, and the total amount of SrO and BaO will be from 2 to 15 mass % and the total amount of CaO, SrO and BaO will be from 4 to 35 mass %, as calculated as oxides based on 100 mass % of alkali-free glass obtainable from the granules.

As an example of the glass raw material composition, a mixture having the following compositional proportions based on 100 mass % of the glass raw material composition, may be mentioned.

Silica: from 40 to 60 mass %, alumina cement containing $CA_2$: from 5 to 45 mass %, aluminum oxide: from 0 to 25 mass %, calcium oxide: from 0.1 to 5 mass %, magnesium hydroxide: from 0 to 15 mass %, calcium carbonate: from 0 to 15 mass %, strontium carbonate: from 0 to 15 mass %, barium carbonate: from 0 to 15 mass %, dolomite: from 0 to 15 mass %, magnesium chloride: from 0 to 5 mass %, magnesium sulfate: from 0 to 5 mass %, other raw materials: from 0 to 5 mass %.

The glass raw material composition preferably contains substantially no boron oxide or boric acid, or if contains, a small amount of it. Here, boric acid is a generic term for an oxygen acid of boron, such as orthoboric acid ($H_3BO_3$), metaboric acid or the like. Boron oxide is meant for boron oxide represented by $B_2O_3$. If the glass raw material composition contains boric acid, when the boric acid and water are mixed, a boric acid solution will be formed. If boron oxide and water are mixed, at least a portion of the boron oxide will be decomposed to form a boric acid solution. If the glass raw material composition contains a boric acid solution, there is a possibility that the curing rate of $CA_2$ becomes too slow. In a case where the glass raw material composition contains one or both of boron oxide and boric acid, the total amount of boron oxide and boric acid contained in the glass raw material composition, is preferably at most 3 mass %, more preferably at most 1 mass %, based on 100 mass % of the glass raw material composition. The total amount of boron oxide and boric acid is further preferably 0 mass % (0 mass % is meant for below the detection limit).

The glass raw material composition preferably contains no alkali metal source, or if contains, a small amount of it. Containing no alkali metal source means that the amount of the alkali metal source is below the detection limit. And a small amount if it contains an alkali metal source, means that the total amount of the alkali metal source in the glass raw material composition is at most 0.1 mass %, preferably at most 0.02 mass %, based on 100 mass % of alkali-free glass obtainable from the granules.

If the glass raw material composition contains more than the above-mentioned amount of the alkali metal source, alkali metal ions may be eluted from the glass raw material composition to form an alkaline solution when the glass raw material composition and water are mixed. If the alkaline solution is contained, there is a possibility that the curing rate of $CA_2$ becomes too fast during the production of granules. Further, if the glass raw material composition contains greater than the above-mentioned amount of the alkali metal source, it will be difficult to use such granules for the production of alkali-free glass.

[Average Particle Sizes of Glass Raw Materials]

Glass raw materials contained in the glass raw material composition are preferably in a powder form because of handling efficiency in subsequent steps. Powdery glass raw materials preferably have suitable particle sizes.

When the glass raw material composition contains powdery silica, D50 of silica is preferably from 2 to 150 μm. The upper limit value of D50 of silica is more preferably 100 μm, further preferably 50 μm, particularly preferably 30 μm. The lower limit value of D50 of silica is more preferably 5 μm, further preferably 10 μm.

When D50 of silica is at most the above upper limit value, the strength of granules is likely to be higher. And at the time of heating and melting the granules, non-melted material is less likely to remain, and a homogeneous glass melt is readily obtainable. Further, when D50 is at least the above lower limit value, aggregation or scattering of the glass raw material is less likely to occur at the time of producing granules.

When the glass raw material composition contains powdery alumina cement, D50 of the alumina cement is preferably from 1 to 100 μm, more preferably from 2 to 80 μm. When D50 of the alumina cement is in the above range, scattering or aggregation is less likely to occur at the time of producing granules, and the granules can be easily obtained in a relatively short period of time.

When the glass raw material composition contains powdery calcium oxide, D50 of the calcium oxide is preferably from 1 to 100 μm, more preferably from 2 to 20 μm. When D50 of the calcium oxide is in the above range, scattering or aggregation is less likely to occur at the time of producing granules, and the granules can be easily obtained in a relatively short period of time.

When the glass raw material composition contains powdery calcium hydroxide, D50 of the calcium hydroxide is preferably from 1 to 100 μm, more preferably from 2 to 20 μm. When D50 of the calcium hydroxide is within the above range, scattering or agglomeration is less likely to occur at the time of producing granules, and the granules can be easily obtained in a relatively short period of time.

Aluminum oxide, magnesium oxide, magnesium hydroxide, dolomite, calcium carbonate, strontium carbonate, barium carbonate, fluorite, and red iron oxide are hardly water-soluble raw materials with relatively small solubility in water, whereby they are hardly miniaturized when the glass raw material composition and water are mixed. In a case where these hardly water-soluble raw materials are used in a powder form, D50 thereof is preferably at most 100 μm, more preferably at most 40 μm, further preferably at most 20 μm. D50 of the hardly water-soluble raw materials is preferably at least 1 μm, more preferably at least 2 μm.

When D50 of the hardly water-soluble raw materials is within the above range, the homogeneous glass melt is easily obtainable, and aggregation or scattering of glass raw materials is less likely to occur at the time of producing granules.

The hardly water-soluble raw materials are preferably preliminarily micronized, as the case requires. Otherwise, it is preferred that at the time of mixing the glass raw material composition containing them and water, the glass raw materials are finely pulverized by using a ball mill or the like.

Magnesium chloride, calcium chloride, etc. have a large solubility in water and are readily soluble or micronized when mixed with water, even if D50 before mixing is large. Therefore, their D50 is not particularly limited.

D50 of each powdery glass raw material in the glass raw material composition is preferably adjusted in a relative relationship with D50 of the granules. If D50 of each component is too large as compared with D50 of the granules, there is a possibility that the compositions of individual granules become inhomogeneous to one another.

For example, when D50 of granules is at most 3 mm, D50 of powdery glass raw material is preferably at most 50 μm, more preferably at most 20 μm, particularly preferably at most 10 μm.

Further, D50 of powdery glass raw material is preferably from 1/200 to 1/10, more preferably from 1/100 to 1/20, of D50 of granules.

Even when the ratio of D50 of powdery glass raw material to D50 of granules is within the above range, it is preferred to carry out a step of finely pulverizing the glass raw material prior to granulating the glass raw material composition, with a view to improving homogeneity of glass to be produced.

<Step of Granulating Glass Raw Material Composition>

In the step of granulating the glass raw material composition, when the glass raw material composition and water are mixed, the surface of glass raw material is in contact with water. In the glass raw material composition, $CA_2$ and one or both of calcium oxide and calcium hydroxide, are contained, and when they are in contact with water, a gel-like hydrate will be formed. The gel-like hydrate will be a binder which binds the other glass raw materials. Thus, granules are obtained by mixing the glass raw material composition and water.

The method of mixing the glass raw material composition and water may be a method wherein after mixing the glass raw material composition, water is added, followed by further mixing, or a method wherein the glass raw material composition and water are not mixed all at once, but dividedly mixed repeatedly. In the latter method, it is preferred that after dissolving water-soluble glass raw material in water, glass raw material insoluble or hardly soluble in water is mixed.

The glass raw material containing $CA_2$ is preferably mixed with water at an early stage during the mixing with water. The reason is that by adding and mixing one or both of calcium oxide and calcium hydroxide and a silicon source to a hydrate of $CA_2$, homogeneous granules are easily obtainable in a short time. For example, in a case where the glass raw material composition contains alumina cement containing $CA_2$, it is preferred to produce granules via a step of mixing alumina cement and water to obtain a hydrate (hereinafter this step will be referred to as the preliminary hydration step), and adding and mixing one or both of calcium oxide and calcium hydroxide, and a silicon source, to the obtained hydrate of alumina cement. The amount of water used in the preliminary hydration step may be a part or whole of water to be used to produce granules.

Further, when the glass raw material composition is used as preliminarily stirred and mixed, a variation in the composition of individual granules tends to become smaller.

The granulation method may be a method of granulating by compression forming after mixing the glass raw material composition and water, or a method of granulating while mixing the glass raw material composition and water without compression. In an embodiment of the present invention, it is preferred to use a suitable granulation method depending on D50 of the desired granules.

In a case where it is desired to bring D50 of granules to be more than 15 mm, it is preferred that in the step of granulating the glass raw material composition, mixing of the glass raw material composition and water, is followed by compression forming, to obtain granules. Hereinafter, granules obtained by this method will be called briquettes.

Mixing the glass raw material composition is preferably carried out to such an extent that the glass raw material composition becomes to be sufficiently homogeneous. As a method for compression forming after mixing the glass raw material composition and water, a known method may suitably be used. As an apparatus for compression forming after mixing the glass raw material composition and water, for example, a tableting machine, an extrusion forming machine or a briquette machine may suitably be used.

In a case where it is desired to bring D50 of granules to be at most 15 mm, it is preferred to obtain granules by hardening while mixing the glass raw material composition and water. As an apparatus for mixing the glass raw material composition and water, a ball mill, a Henschel mixer, an extrusion granulator, an agitation granulator or a tumbling granulator may be utilized. A method of using a tumbling granulator (a tumbling granulation method) is preferred in that the glass raw material composition and water tend to be homogeneously and efficiently mixed.

As a method of adding water to the glass raw material composition, it is possible to use a method of spraying water to the glass raw material composition. Spraying water to the glass raw material composition may be applied to the glass raw material composition which is being stirred or may be applied to the glass raw material composition at rest. Granulation starts from a portion where water and glass raw material are in contact, and therefore, in order to prevent local curing, it is preferred to add the entire amount of water to be added in the granulation step, in a short time, for example, in from 1 second to 30 minutes, preferably in from 1 second to 10 minutes.

The tumbling granulation method may, for example, be a method for granulation wherein a predetermined amount of the glass raw material composition and a predetermined amount of water are put in a container of a tumbling granulator, and the container is rotated, or a method for granulation wherein a predetermined amount of the glass raw material composition is put in a container of a tumbling granulator, and while the glass raw material composition is tumbled, stirred and mixed by rotating the container, a predetermined amount of water is sprayed to the glass raw material composition. The container of the tumbling granulator may be a pan, cylindrical or conical rotary container, or a vibration-type container.

Further, the tumbling granulator to be used in the tumbling granulation method may, for example, be one provided with a container for rotation with a rotation axis in an inclined direction to the vertical direction, and rotor blades for rotation in the opposite direction to the container about the rotation axis in the container. Such a tumbling granulator may, for example, be Eirich Intensive Mixer (manufactured by Eirich Co., Ltd.) or Lodige Mixer (manufactured by Loedige Co., Ltd.).

In the granulation step, the mixing conditions such as the time for mixing the glass raw material composition with water, may suitably be determined depending upon the types and amounts of glass raw materials constituting the glass raw material composition, the amount of water, the apparatus to be used, etc.

At the time of granulation while mixing the glass raw material composition and water, when calcium aluminate such as $CA_2$ contained in the glass raw material composition is contacted with water to form a hydrate, heat is generated. Further, in a case where the glass raw material composition contains calcium oxide, when calcium oxide and water are contacted to form calcium hydroxide, heat is generated. The temperature of the glass raw material composition in the granulation step is preferably at least 50° C., more preferably at least 55° C., in that the step can thereby be shortened. However, if the temperature of the glass raw material composition is too high, curing of the glass raw material composition is locally promoted, and granules may not be formed, or granules with expected shape and size may not be obtained.

Further, the glass raw material composition is preferably formulated by a method wherein a preliminary hydration step is conducted by preliminarily mixing a powder containing $CA_2$ such as alumina cement with water to form a hydrate, and then, a silicon source, etc. are added, followed by mixing, whereby more rigid granules tend to be easily obtainable.

The amount of water to be used in the preliminary hydration step may be a part or whole of water to be used in the granulation step. The amount of water is preferably from 0.5 to 5 mass %, more preferably from 1 to 3 mass %, by outer percentage, to 100 mass % of the powder containing $CA_2$ such as alumina cement.

At the time of mixing alumina cement and water in the preliminary hydration step, it is preferred that after stirring to such an extent that the whole becomes a homogeneous slurry, the slurry state is preferably maintained for from 1 to 18 hours.

In mixing of the glass raw material composition and water, it is preferred that after solidifying while mixing the glass raw material composition and water, granules are obtained at a temperature of at most 800° C. When the temperature of granules is at most 800° C., granules are less likely to be sintered, and it is easy to handle granules. The obtainable granules will not require a step of further sintering the granules after granulation.

Granules obtained in the granulation step contain water, and therefore, they may be dried. The temperature for drying the granules is preferably at most 800° C., more preferably at most 500° C., and from the viewpoint of the operation efficiency, it is further preferably from 80 to 200° C. The obtained granules may be sieved, as the case requires.

<Granules>

Granules obtainable by a method according to one embodiment of the present invention are granules to be used for the production of alkali-free glass. Further, granules according to one embodiment of the present invention, are preferably granules to be used for the production of a glass product made of alkali-free glass. Granules in one embodiment of the present invention essentially comprise a silicon source and $3CaO.Al_2O_3.6H_2O$.

The composition of the granules is formulated so that a desired glass composition is obtainable when it is vitrified by heating and melting it. The amount of the alkali metal component in the granules is preferably at most 0.1 mass %, more preferably at most 0.02 mass %, based on 100 mass % of alkali-free glass obtainable from the granules.

Granules in one embodiment of the present invention contains $3CaO.Al_2O_3.6H_2O$. $3CaO.Al_2O_3.6H_2O$ is a component which is produced in contact with water in the presence of calcium aluminate such as $CA_2$, and a CaO source such as calcium oxide or calcium hydroxide.

Further, it is considered that in granules, a gel-like component is contained which is formed by contact of calcium oxide or calcium hydroxide with water. When these components are present at the same time in the granulation step, strong granules will be obtainable.

The composition as calculated as oxides, of granules, is substantially equal to the composition of alkali-free glass obtainable from the granules, with the exception of the refining agent component and water. In a case where alkali-free glass obtainable from the granules contains $B_2O_3$, it is preferred that in consideration of the volatilization in the melting step, the amount as calculated as $B_2O_3$ of e.g. boric acid in the granules is adjusted to be larger than the $B_2O_3$ amount in the glass composition. Even in a case where alkali-free glass obtainable from the granules contains no $B_2O_3$, boric acid may be contained in the granules, so long as it volatilizes in the melting step.

D50 of the granules in one embodiment of the present invention is preferably from 50 μm to 50 mm. When D50 is within the above range, dust is unlikely to occur, and highly homogeneous granules are easily obtainable.

In a case where granules are briquettes, the shape of the briquettes may, for example, be a sphere, cylinder, cuboid, ellipsoid or the like. When the briquettes are spherical, D50 is preferably from 1 mm to 50 mm, more preferably from 5 to 30 mm. When briquettes are ellipsoidal, the average value of the major axis is preferably from 5 mm to 50 mm, more preferably from 10 to 30 mm. When it is at least the lower limit value in the above range, briquettes can be easily formed by a common briquetting machine, and when it is at most the upper limit value, it will be easy to obtain homogeneous glass.

When solidifying while mixing the glass raw material composition and water to form granules, the shape of the granules is, for example, spherical. D50 in the case where granules are spherical, is preferably from 50 μm to 15 mm, more preferably from 1 mm to 10 mm. When it is at least the lower limit value in the above range, the granules themselves tend less likely to become dust, and when it is at most the upper limit value, highly homogenous granules are easily obtainable. In particular, D50 of the granules to be used in the method for producing a glass melt in the after-mentioned in-flight melting method is preferably from 50 to 1,000 μm, more preferably from 50 to 800 μm. When D50 of the granules is at least 50 μm, it is possible to reduce scattering, etc. of the glass raw material, such being desirable. Further, D50 of the granules being at most 1,000 μm is preferred in that the granules can thereby be quickly vitrified. D50 of the granules can be adjusted depending upon the conditions such as the composition of the glass raw material, the mixing method and mixing time in the granulation step, etc. In the case of producing a glass melt in an in-flight melting method, granules are more preferably ones with little variation in the particle size so that a glass product having a homogeneous glass composition is obtainable.

D50 of granules to be used in the method for producing a glass melt by the after-described usual melting method is preferably from 1 mm to 50 mm, more preferably from 1 to 15 mm. When D50 of the granules is within the above range, entrainment of bubbles tends to be less at the time of melting.

In the case of producing a glass product by using a glass melt produced by a usual melting method, it is preferred that the granules do not contain an organic substance. If the granules contain an organic substance, such a substance may impair the color tone or appearance of the glass product.

«Method for Producing Glass Product»

One embodiment of the method for producing a glass product of the present invention is a method for producing a glass product, wherein the granules of the present invention are heated to obtain a glass melt, and the glass melt is formed and annealed to obtain a glass product. Another embodiment of the method for producing a glass product of the present invention is a method for producing a glass product wherein granules are obtained by the method for producing granules of the present invention, the granules are then heated to obtain a glass melt, and the glass melt is formed and annealed to obtain a glass product.

<Melting Step>

The melting step is a step of heating and melting the granules.

The method for melting the granules in the melting step is not particularly limited, and a known method for melting glass raw material may be applied. Melting of the granules may be carried out by a usual melting method using a glass melting furnace of Siemens type or crucible type, or may be carried out by an in-flight melting method.

In the case of producing a large quantity of glass using a large-sized apparatus, in the melting step, granules and cullet obtainable by crushing e.g. glass plates may be mixed and melted. The granules in one embodiment of the present invention are preferred even when the granules and cullet are mixed and charged, since they are less likely to be broken. Cullet is preferably one having a glass composition equal to the glass melt obtainable from the granules in one embodiment of the present invention. Specifically, it is preferred to use cullet of a glass product obtainable by using the granules in one embodiment of the present invention, or cullet formed in a step of producing a glass product.

[Usual Melting Method]

In the case of melting the granules by a usual melting method, the granules are put into a glass melting furnace and heated to let melting proceed to gradually form a glass melt. In a case where a glass melt is present in a glass melting furnace, granules are put on the liquid surface of the glass melt, and those having the granules formed into a mass (so-called a batch mountain or a batch pile) are heated and melted by e.g. a burner.

[In-Flight Melting Method]

An in-flight melting method is a method of melting glass raw material in a gas phase atmosphere to form molten glass particles, and collecting the molten glass particles to form a glass melt. The in-flight melting method is also referred to as an in-flight-melting method.

In the case of melting the granules by the in-flight melting method, firstly the granules are introduced into a high-temperature gas-phase atmosphere of an in-flight heating apparatus and melted in the gas phase atmosphere to form molten glass particles. The in-flight heating apparatus may be a known one. The granules of the present invention are less susceptible to breakage, and therefore, even if collision with particles one another or with e.g. the transport path inner wall occurs, in the transport or the like, formation of fine powder can be suppressed.

Then, the molten glass particles in the in-flight heating apparatus are collected to obtain a glass melt, and the taken out glass melt is supplied to a subsequent forming step. The method of collecting the molten glass particles may, for example, be a method wherein molten glass particles falling by their own weight in the gas phase atmosphere, are received and collected in a heat-resistant container provided at a lower portion of the gas phase atmosphere.

<Forming Step and Annealing Step>

Figure 1:
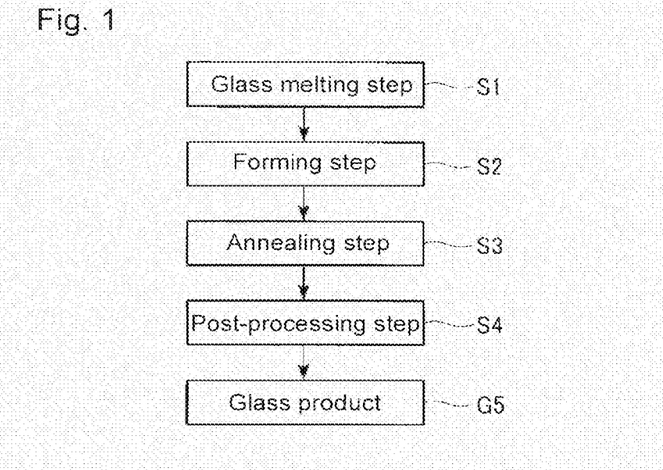
FIG. 1 is a flow chart illustrating an example of a method for producing a glass product.

FIG. 1 is a flowchart showing an example of the method for producing a glass product of the present invention. Symbol S1 is a glass melting step.

Firstly, a glass melt obtained in the glass melting step S1 is formed into a desired shape in a forming step S2 and annealed in an annealing step S3, to obtain a glass product G5. Thereafter, as the case requires, post-processing such as cutting or polishing may be applied by a known method in a post-processing step S4. Further, the post-processing step may be a surface treatment step or the like, other than the above-mentioned post-processing step that does not affect the glass composition of the glass product.

When the glass product is a plate-form product, the forming step may be carried out by a known process such as a float process, a down drawing method or a fusion method. The float process is a method of forming a glass melt into a plate shape on molten tin. The annealing step S3 may also be carried out by a known method. In the production of a glass product, by using the granules of the present invention, it is possible to obtain a glass product of good quality while preventing scattering of glass raw material.

<Glass Product>

The glass product according to one embodiment of the present invention is one formed into a desired shape, by melting the granules in the melting step, followed by forming, annealing, and, if necessary, cutting after the annealing. The shape of the glass product may, for example, be flat, curved, cylindrical or container-like. Here, the glass product may be one subjected to surface treatment in a step after the melting step, or after formed into the glass product.

The glass product to be produced by the method in one embodiment of the present invention is preferably a glass product made of alkali-free glass. The glass product preferably contains the following glass components. Here, in a case where glass components of a glass product are shown as follows, 100 mass % of the glass product represents the entire mass of one formed by solidification of a glass melt obtained by melting the granules, and shall not contain the mass of components processed on the surface of the glass product by the post-treatment step.

The glass product is preferably a glass product comprising, as calculated as oxides based on 100 mass % of the glass product, from 40 to 85 mass % of $SiO_2$, from 5 to 30 mass % of $Al_2O_3$, from 0 to 18 mass % of MgO and from 2 to 40 mass % of CaO. In addition, the glass product may contain a small amount of non-metal oxides (such as sulfur oxides), halogens or the like. The total amount of non-metal oxides and halogens is preferably from 0 to 5 mass % based on 100 mass % of the glass product.

The glass product is more preferably a glass product containing, as calculated as oxides based on 100 mass % of the glass product, from 2 to 18 mass % of CaO, and at least one of SrO and BaO, wherein the total amount of CaO, SrO and BaO is from 2 to 40 mass %.

The glass product is further preferably a glass product comprising, as calculated as oxides based on 100 mass % of the glass product, from 45 to 65 mass % of $SiO_2$, from 10 to 25 mass % of $Al_2O_3$, from 2 to 18 mass % of MgO, from 2 to 18 mass % of CaO, wherein the total amount of SrO and BaO is from 2 to 15 mass %, and the total amount of CaO, SrO and BaO is from 4 to 35 mass %.

The glass product according to one embodiment of the present invention is preferably a plate-form glass product. The plate-form glass product is used for a display substrate or the like. When the glass product is a plate-form glass product, it is more preferred to contain at least 0.4 mass % of MgO in the above-mentioned glass composition. Such a glass composition is suitable for forming by using a float process.

The glass product preferably contains no $B_2O_3$, or the content of $B_2O_3$ is preferably small. The content of $B_2O_3$ in the glass product is preferably from 0 to 3 mass %, more preferably from 0 to 1 mass %, most preferably 0 mass % (0 mass % is meant for below the detection limit), as calculated as oxide based on 100 mass % of the glass product. When $B_2O_3$ is less, the strain point of the glass product becomes high.

EXAMPLES

In the following, the present invention will be described in detail with reference to Examples, but it should be understood that the present invention is by no means limited to these Examples.

<Alumina Cements (A1) to (A3)>

As alumina cements (A1) to (A3), the following commercially available alumina cements containing calcium aluminate were used.

Alumina cement (A1): manufactured by AGC Ceramics Co., Ltd., product name UCA-70N. As calcium aluminate, it contains CA and $CA_2$.

Alumina cement (A2): manufactured by AGC Ceramics Co., Ltd., product name HAC. As calcium aluminate, it contains CA and $CA_2$.

Alumina cement (A3): manufactured by AGC Ceramics Co., Ltd., product name AC-1. It contains CA as calcium aluminate.

With respect to alumina cements (A1) to (A3), the composition of the main components (represented by mass percentages based on oxides) and the mass ratio of CA:$CA_2$ are shown in Table 1.

Figure 2:
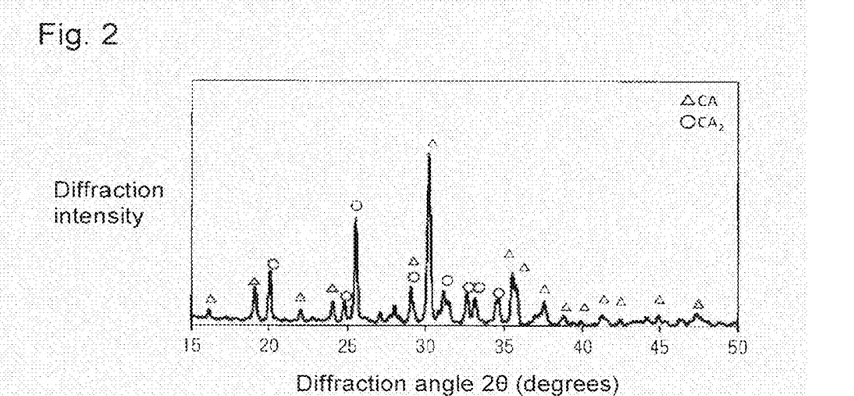
FIG. 2 is an X-ray diffraction spectrum of alumina cement (A1) used in Ex. 1.
Figure 3:
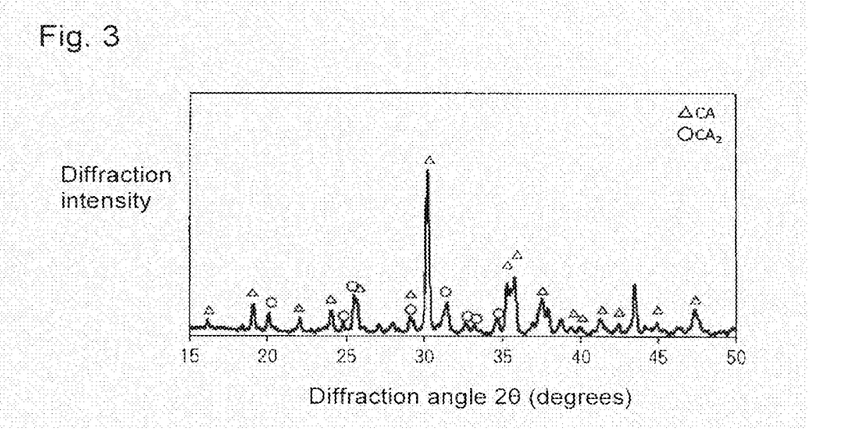
FIG. 3 is an X-ray diffraction spectrum of alumina cement (A2) used in Ex. 2.
Figure 4:
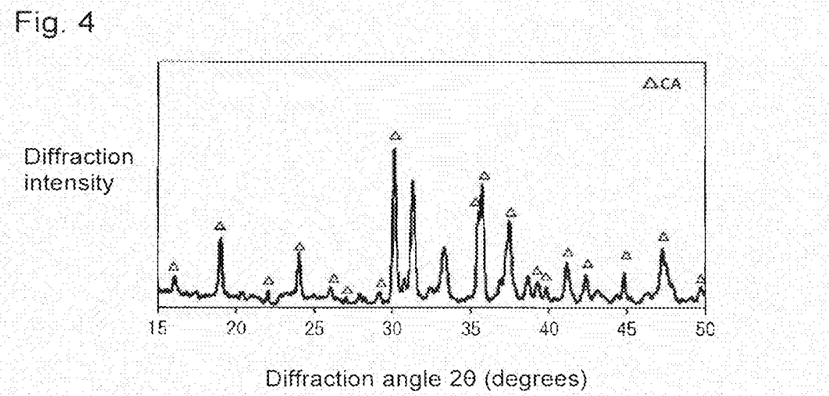
FIG. 4 is an X-ray diffraction spectrum of alumina cement (A3) used in Ex. 3.

With respect to alumina cements (A1) to (A3), the X-ray diffraction spectra obtained by powder X-ray diffractometry using a CuKα ray are shown in FIGS. 2 to 4. In each Fig, a peak marked with ○ is a diffraction peak of $CA_2$, and a peak marked with Δ is a diffraction peak of CA. FIG. 2 is the X-ray diffraction spectrum of alumina cement (A1), FIG. 3 is that of alumina cement (A2), and FIG. 4 is that of alumina cement (A3).

Preparation Example 1: Preparation of Alumina Cement (A4)

Alumina cement (A4) was prepared by the following method. Calcium aluminate contained in alumina cement (A4) is $C_3A$, and neither CA nor $CA_2$ is contained.

Firstly, calcium carbonate and aluminum oxide were weighed so that the molar ratio of $CaCO_3$:$Al_2O_3$ would be 3:1, and after mixing for 10 minutes, the mixture was packed in a cylindrical platinum container having a diameter of about 150 mm and a height of about 50 mm, and placed and fired in an electric furnace maintained at 1,350° C. After cooling, the product was pulverized so that D50 would be about 50 μm thereby to obtain a powder (alumina cement (A4)) containing calcium aluminate. The composition of the main components of alumina cement (A4) (represented by mass percentages based on oxides) as calculated from the raw material composition, is shown in Table 1.

Figure 5:
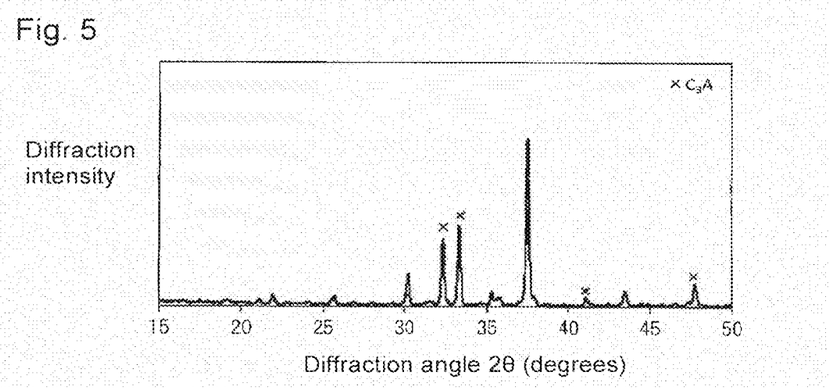
FIG. 5 is an X-ray diffraction spectrum of alumina cement (A4) used in Ex. 4.

With respect to the obtained alumina cement (A4), the X-ray diffraction spectrum obtained by powder X-ray diffractometry using a CuKα ray is shown in FIG. 5. In FIG. 5, a peak marked with x is a diffraction peak of $C_3A$. No peak of CA or $CA_2$ existed.

TABLE 1

| | | A1 | A2 | A3 | A4 |
|---|---|---|---|---|---|
| Composition of alumina cement [mass %] | $SiO_2$ | 0.3 | 0.5 | 4.0 | — |
| | $Al_2O_3$ | 71.0 | 73.1 | 55.0 | 37.8 |
| | $Fe_2O_3$ | 0.08 | 0.23 | 1.00 | — |
| | $TiO_2$ | — | 0.05 | 2.70 | — |
| | CaO | 28.0 | 25.1 | 36.0 | 62.2 |
| | MgO | — | 0.10 | 0.60 | — |

TABLE 1-continued

| | A1 | A2 | A3 | A4 |
|---|---|---|---|---|
| Mass ratio of CA:$CA_2$ | 54:46 | 49:51 | 100:0 | (Only $C_3A$) |
| X-Ray diffraction spectrum | FIG. 2 | FIG. 3 | FIG. 4 | FIG. 5 |

<Production of Granules>

D50 of each glass raw material used in the following production examples of granules was measured. The results are shown in Table 2. However, the glass raw materials shown in the Table are components other than components which are readily dissolved or hydrated when water is added (alumina cement, calcium oxide, magnesium sulfate and magnesium chloride). The measurement was conducted by a laser diffraction method. As magnesium sulfate, a heptahydrate was used, and as magnesium chloride, a hexahydrate was used.

TABLE 2

| | D50 (μm) |
|---|---|
| Silica sand (silica) | 26 |
| Aluminum oxide | 55 |
| Calcium hydroxide (hydrated lime) | 8 |
| Calcium carbonate | 15 |
| Magnesium hydroxide | 4 |
| Strontium carbonate | 3 |

In the following examples for the production of granules, the glass raw material composition was used as formulated so as to obtain glass having glass composition G1 or G2 as shown in Table 3.

TABLE 3

| | Glass composition (unit: mass %) | |
|---|---|---|
| | G1 | G2 |
| $SiO_2$ | 63.3 | 61.6 |
| $Al_2O_3$ | 21.7 | 21.0 |
| MgO | 4.4 | 6.0 |
| CaO | 6.9 | 4.5 |
| SrO | 3.7 | 6.8 |
| Cl | 1.0 | 1.0 |
| $SO_3$ | 0.3 | 0.3 |

Ex. 1 to 4: Examples for Production of Granules

Using the above-mentioned alumina cements (A1) to (A4), granules were produced with formulations as shown in Table 4.

Ex. 3 is a comparative example using alumina cement (A3) containing no $CA_2$. Ex. 4 is a comparative example using alumina cement (A4) containing neither CA nor $CA_2$. Ex. 1 and 2 are examples of the present invention.

Using a tumbling granulator (Eirich-Intensive Mixer R02 model, manufactured by Eirich Co., Ltd.), granulation was carried out by the following procedure.

Firstly, 3.0 kg of a glass raw material composition was weighed with a formulation (represented by mass percentage) as shown in Table 4. Of 3.0 kg of the glass raw material composition, magnesium sulfate and magnesium chloride were dissolved to a predetermined amount of dissolving water to obtain an aqueous solution, and the rest of the glass raw materials was put into the tumbling granulator. Mixing was conducted under conditions of a pan rotational speed of 42 rpm, a rotor rotational speed 900 rpm and a mixing time of 30 seconds.

Then, the rotor was stopped, and while only the pan was rotated, the aqueous solution obtained by dissolving magnesium sulfate and magnesium chloride as mentioned above, was introduced, and granulation was conducted for 18 minutes by raising the rotor rotational speed to 3,000 rpm. During this period, water was added while watching the appearance.

Then, the rotor rotational speed was lowered to 900 rpm, and particle size regulation was conducted for 1 minute, whereupon the product was put in a stainless steel container and subjected to heat drying in a hot air drier at 80° C. for 12 hours to obtain granules.

By a thermometer installed in the granulator, the temperature of the glass raw material composition in the granulation step was measured. During the period after introducing the aqueous solution obtained by dissolving magnesium sulfate and magnesium chloride, until finishing the particle size regulation for 1 minute, the highest temperature was at 60° C.

Dissolving water used in Ex. 1 to 4 was 570 g, and added water was 20 g.

In Ex. 1 and 2, the glass raw material composition was granulated into particles larger than the powders of the glass raw materials, but in Ex. 3 and 4, the glass raw material composition remained to be substantially powdery and granules were not formed.

Figure 6:
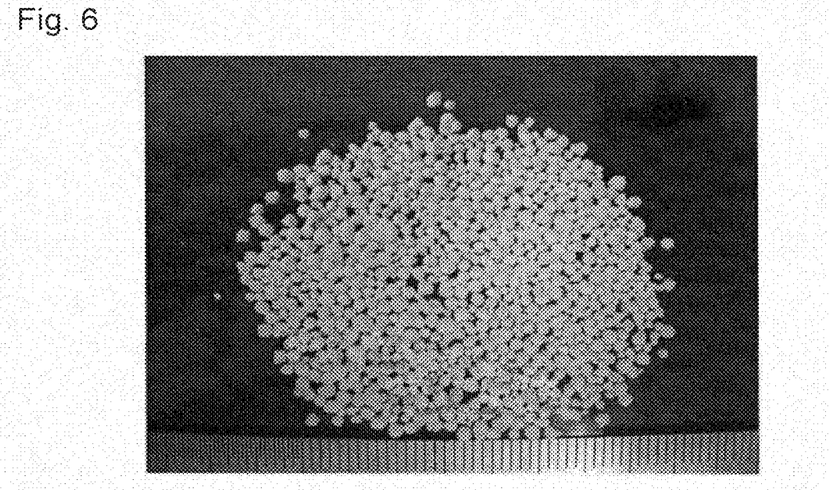
FIG. 6 is a photograph showing the particle state after the granulation step in Ex. 1.
Figure 7:
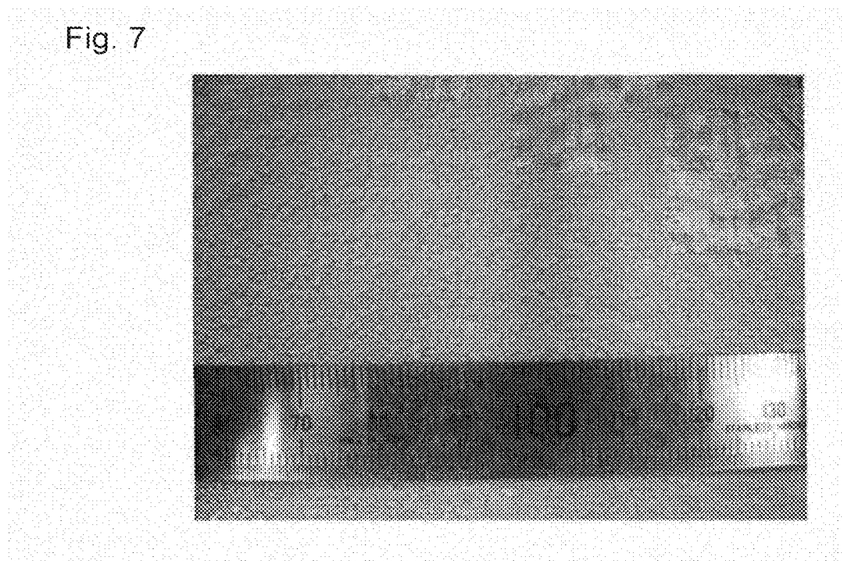
FIG. 7 is a photograph showing the particle state after the granulation step in Ex. 3.

FIG. 6 is a photograph showing a particle state after the granulation step in Ex. 1, and it is seen that granules were formed. FIG. 7 is a photograph showing a particle state after the granulation step in Ex. 3, it is seen that granules were not formed.

The average particle diameter of D50 of the obtained granules in Ex. 1 and 2 were measured by a method (sieving method) for determining the average particle diameter by classification by means of sieves. The results are shown in Table 4.

[Evaluation of Rigidity of Granules]

In a case where the obtained granules are hardly breakable and rigid, when their particle size distribution is measured, a large number of granules are within a range of from 0.5 times D50 to 1.5 times D50, and thus, their particle sizes are uniform. Therefore, the rigidity of granules was evaluated as follows by the proportion of granules having particle sizes in the range of from 0.5 times to 1.5 times D50 by measuring the particle size distribution. The results are shown in Table 4.

⊚: 80% or more of the particle sizes are within the above range, and the particle sizes are very uniform. Hardly breakable rigid granules are obtained.

◯: About 50% to 80% of the particle sizes are in the above range, and the particle sizes are uniform to some extent. To some extent, rigid granules are obtained.

Δ: Less than 50% of the particle sizes are within the above range, and the particle sizes are not uniform. Although granulated, the granulated particles are fragile.

TABLE 4

|  |  | Ex. 1 | Ex. 2 | Ex. 3 | Ex. 4 |
|---|---|---|---|---|---|
| Glass raw materials [mass %] | Silica sand (silica) | 58.7 | 58.7 | 58.7 | 58.7 |
|  | Alumina cement (A1) | 11.3 | — | — | — |
|  | Alumina cement (A2) | — | 12.2 | — | — |
|  | Alumina cement (A3) | — | — | 8.0 | — |
|  | Alumina cement (A4) | — | — | — | 5.1 |
|  | Aluminum oxide | 12.1 | 11.2 | 15.4 | 18.3 |
|  | Calcium hydroxide | 4.2 | 4.2 | 4.2 | 4.2 |
|  | Magnesium hydroxide | 5.2 | 5.2 | 5.2 | 5.2 |
|  | Magnesium chloride | 2.6 | 2.6 | 2.6 | 2.6 |
|  | Magnesium sulfate | 0.9 | 0.9 | 0.9 | 0.9 |
|  | Strontium carbonate | 5.0 | 5.0 | 5.0 | 5.0 |
|  | Toal | 100 | 100 | 100 | 100 |
| Glass composition |  | G1 | G1 | G1 | G1 |
| Rigidity of granules |  | ⊚ | Δ | X | X |
| D50 [mm] of granules |  | 2.0 | 2.0 | — | — |
| Photograph of granules |  | FIG. 6 | — | FIG. 7 | — | x: Granules are not formed.

In Ex. 1 and 2 wherein alumina cement (A1) or (A2) containing CA and $CA_2$, was used, granules were obtained. Further, when Ex. 1 and Ex. 2 are compared, the granules obtained in Ex. 1 were more hardly breakable and more rigid.

On the other hand, in Ex. 3 and 4 wherein alumina cements (A3) and (A4) containing no $CA_2$ were used, no granules were formed, and a uniformly mixed powder was obtained with particle sizes being substantially the same as the glass raw materials before granulation.

Ex. 11 to 23: Examples for Production of Granules

In these examples, granules were produced without using calcium oxide and by changing the added amounts of calcium hydroxide and alumina cement (A1). Ex. 11 to 13 are comparative examples wherein no calcium hydroxide was added. Ex. 14 is a comparative example wherein no alumina cement was used.

D50 of granules were measured in the same manner as in Ex. 1. The rigidity of granules was evaluated in the same manner as in Ex. 1. These results are shown in Table 5.

TABLE 5

|  |  | Ex. 11 | Ex. 12 | Ex. 13 | Ex. 14 | Ex. 15 | Ex. 16 | Ex. 17 | Ex. 18 | Ex. 19 | Ex. 20 | Ex. 21 | Ex. 22 | Ex. 23 |
|---|---|---|---|---|---|---|---|---|---|---|---|---|---|---|
| Glass raw materials [mass %] | Silica sand (silica) | 56.6 | 57.9 | 59.3 | 58.2 | 59.0 | 60.0 | 58.7 | 58.3 | 58.6 | 58.5 | 58.0 | 56.2 | 56.4 |
|  | Alumina cement (A1) | 0.0 | 11.1 | 22.9 | — | 17.1 | 17.3 | 11.3 | 11.2 | 8.2 | 5.6 | 5.6 | 7.2 | 10.9 |
|  | Aluminum oxide | 19.4 | 11.9 | 4.1 | 20.0 | 8.1 | 6.2 | 12.1 | 12.0 | 14.2 | 16.0 | 15.9 | 14.0 | 11.5 |
|  | Calcium hydroxide | — | — | — | 8.3 | 2.1 | 1.1 | 4.2 | 2.1 | 5.3 | 6.2 | 3.0 | 2.7 | 1.3 |
|  | Calcium carbonate | 10.9 | 5.6 | — | — | — | 1.4 | — | 2.8 | — | — | 4.1 | — | — |
|  | Magnesium hydroxide | 4.9 | 5.1 | 5.2 | 5.1 | 5.1 | 5.3 | 5.2 | 5.1 | 5.3 | 5.2 | 5.1 | 7.3 | 7.4 |
|  | Magnesium chloride | 2.5 | 2.6 | 2.7 | 2.6 | 2.7 | 2.7 | 2.6 | 2.6 | 2.6 | 2.6 | 2.6 | 2.6 | 2.6 |

TABLE 5-continued

|  | Ex. 11 | Ex. 12 | Ex. 13 | Ex. 14 | Ex. 15 | Ex. 16 | Ex. 17 | Ex. 18 | Ex. 19 | Ex. 20 | Ex. 21 | Ex. 22 | Ex. 23 |
|---|---|---|---|---|---|---|---|---|---|---|---|---|---|
| Magnesium sulfate | 0.8 | 0.9 | 0.9 | 0.9 | 0.9 | 0.9 | 0.9 | 0.9 | 0.9 | 0.9 | 0.9 | 0.8 | 0.8 |
| Strontium carbonate | 4.8 | 4.9 | 5.0 | 4.9 | 5.0 | 5.1 | 5.0 | 4.9 | 5.0 | 5.0 | 4.9 | 9.1 | 9.1 |
| Total | 100 | 100 | 100 | 100 | 100 | 100 | 100 | 100 | 100 | 100 | 100 | 100 | 100 |
| Glass composition | G1 | G1 | G1 | G1 | G1 | G1 | G1 | G1 | G1 | G1 | G1 | G2 | G2 |
| Rigidity of granules | X | X | X | X | ○ | ○ | ⊚ | ○ | ○ | △ | △ | △ | ○ |
| D50 [mm] of granules | — | — | — | — | 2.0 | 2.0 | 2.0 | 2.0 | 2.0 | 2.0 | 2.0 | 2.0 | 2.0 |

In Ex. 11 to 13 wherein no calcium hydroxide was added, no granules were formed even if the amount of alumina cement (A1) was increased.

In Ex. 14 wherein no alumina cement (A1) was added, no granules were formed even if the content of calcium hydroxide was increased.

In Ex. 15 to 23 wherein at least 5 mass % of alumina cement (A1) and at least 1 mass % of calcium hydroxide were contained in 100 mass % of the glass raw material composition, granules were formed. In particular, rigid granules were formed within such a range that based on 100 mass % of the glass raw material composition, the content of alumina cement (A1) was at least 8 mass % and the content of calcium hydroxide was at least 1 mass %, and more rigid granules were formed within such a range that the content of alumina cement (A1) was at least 10 mass %, and the content of calcium hydroxide was at least 4 mass %.

Ex. 31 to 39: Examples for Production of Granules

Granules were produced without using calcium hydroxide and changing the added amounts of calcium oxide and alumina cement (A1) to the amounts shown in Table 6. Ex. 31 is a comparative example wherein no calcium oxide was added.

D50 of granules was measured in the same manner as in Ex.1. The rigidity of granules was evaluated in the same manner as in Ex. 1. These results are shown in Table 6.

TABLE 6

| | | Ex. 31 | Ex. 32 | Ex. 33 | Ex. 34 | Ex. 35 | Ex. 36 | Ex. 37 | Ex. 38 | Ex. 39 |
|---|---|---|---|---|---|---|---|---|---|---|
| Glass raw materials [mass %] | Silica sand (silica) | 56.5 | 56.6 | 56.6 | 56.6 | 56.6 | 56.6 | 56.2 | 56.6 | 61.8 |
| | Alumina cement (A1) | 14.5 | 14.2 | 13.8 | 13.1 | 13.4 | 10.9 | 10.8 | 7.3 | 2.4 |
| | Aluminum oxide | 8.9 | 9.2 | 9.5 | 10.0 | 9.7 | 11.5 | 11.4 | 14.1 | 12.6 |
| | Calcium oxide | — | 0.1 | 0.2 | 0.4 | 0.3 | 1.0 | 0.2 | 2.0 | 0.7 |
| | Calcium carbonate | — | — | — | — | — | — | 1.4 | — | 0.8 |
| | Magnesium hydroxide | 7.4 | 7.4 | 7.4 | 7.4 | 7.4 | 7.4 | 7.3 | 7.4 | 8.1 |
| | Magnesium chloride | 2.6 | 2.6 | 2.6 | 2.6 | 2.6 | 2.6 | 2.6 | 2.6 | 2.8 |
| | Magnesium sulfate | 0.8 | 0.8 | 0.8 | 0.8 | 0.8 | 0.8 | 0.8 | 0.8 | 0.9 |
| | Strontium carbonate | 9.2 | 9.2 | 9.2 | 9.2 | 9.2 | 9.2 | 9.1 | 9.2 | 10.0 |
| | Total | 100 | 100 | 100 | 100 | 100 | 100 | 100 | 100 | 100 |
| | Glass composition | G2 | G2 | G2 | G2 | G2 | G2 | G2 | G2 | G2 |
| | Rigidity of granules | x | △ | ○ | ○ | ○ | ○ | ○ | ○ | x |
| | D50 [mm] of granules | — | 2.0 | 2.0 | 2.0 | 2.0 | 2.0 | 2.0 | 2.0 | 2.0 |

In Ex. 31 wherein no calcium oxide was added, no granules were formed even if the content of alumina cement (A1) was increased.

In Ex. 32 to 39 wherein at least 7 mass % of alumina cement (A1) and at least 0.1 mass % of calcium oxide were contained in 100 mass % of the glass raw material composition (the sum of glass raw materials powder), granules were formed. In particular, within such a range that the content of alumina cement (A1) was at least 7 mass % and the content of calcium oxide was at least 0.2 mass %, in the glass raw materials, more rigid granules were formed, such being preferred.

Ex. 51 to 56: Examples for Production of Granules (with Preliminary Hydration Step)

In these examples, granules were produced by using such a method that after carrying out a preliminary hydration step of preliminarily mixing and hydrating alumina cement (A1) with water, the rest of the glass raw materials were added and mixed.

In these examples, as shown in Table 7, granules were produced without using calcium oxide and by changing the added amounts of calcium hydroxide and alumina cement (A1).

Specifically, granulation was conducted by the following procedure.

Firstly, 3 kg of a glass raw material composition was weighed with the formulation (mass percentages) as shown in Table 7. Of this composition, alumina cement (A1) was dispersed in water for preliminary hydration and left to stand for 6 hours at room temperature for hydration, to form a slurry. Further, magnesium sulfate and magnesium chloride were dissolved in dissolving water to form an aqueous solution.

Using the same tumbling granulator as in Ex. 1, granulation was carried out by the following procedure.

Of 3.0 kg of the glass raw material composition, alumina cement (A1), magnesium sulfate and magnesium chloride were, respectively, dissolved in water to form slurry-form aqueous solutions, the rest of powdery raw materials excluding these, were put into the tumbling granulator, and mixed under the conditions of a pan rotational speed of 42 rpm, a rotor rotational speed of 900 rpm and a mixing time of 30 seconds.

Then, the rotor was stopped, and while only the pan was rotated, the aqueous solution of alumina cement (A1) and the aqueous solution having magnesium sulfate and magnesium chloride dissolved in water as mentioned above, were introduced, whereupon granulation was conducted for 18 minutes by raising the rotor rotational speed to 3,000 rpm. During this period, 20 g of water was added while watching the appearance.

Then, the rotor rotational speed was lowered to 900 rpm, and particle size regulation was carried out for 1 minute, whereupon the product was put in a stainless steel container and subjected to heat drying in a hot air drier at 80° C. for 12 hours to obtain granules.

In the same manner as in Ex.1, the temperature of the glass raw material composition in the granulation step was measured. During the period after introducing the aqueous solution having magnesium sulfate and magnesium chloride dissolved, until finishing the particle size regulation for 1 minute, the highest temperature was 60° C.

Water for preliminary hydration of alumina cement (A1) that was used in each of Ex. 51 to Ex. 56 was 9 g, 13 g, 17 g, 30 g, 43 g or 65 g, respectively, and the dissolving water for magnesium sulfate and magnesium chloride was 561 g, 557 g, 553 g, 540 g, 529 g or 506 g, respectively.

With respect to the obtained granules, D50 of the granulates was measured in the same manner as in Ex. 1. The rigidity of granules was evaluated in the same manner as in Ex. 1. These results are shown in Table 7.

TABLE 7

|  |  | Ex. 51 | Ex. 52 | Ex. 53 | Ex. 54 | Ex. 55 | Ex. 56 |
|---|---|---|---|---|---|---|---|
| Glass raw materials [mass %] | Silica sand (silica) | 56.0 | 56.0 | 56.0 | 56.1 | 56.2 | 56.4 |
| | Alumina cement (A1) | 1.4 | 2.2 | 2.9 | 5.0 | 7.2 | 10.9 |
| | Aluminum oxide | 18.0 | 17.5 | 17.0 | 15.5 | 14.0 | 11.5 |
| | Calcium hydroxide | 4.8 | 4.5 | 4.3 | 3.5 | 2.7 | 1.3 |
| | Magnesium hydroxide | 7.3 | 7.3 | 7.3 | 7.3 | 7.3 | 7.4 |
| | Magnesium chloride | 2.6 | 2.6 | 2.6 | 2.6 | 2.6 | 2.6 |
| | Magnesium sulfate | 0.8 | 0.8 | 0.8 | 0.8 | 0.8 | 0.8 |
| | Strontium carbonate | 9.1 | 9.1 | 9.1 | 9.1 | 9.1 | 9.1 |
| | Total | 100 | 100 | 100 | 100 | 100 | 100 |
| | Glass composition | G2 | G2 | G2 | G2 | G2 | G2 |
| | Rigidity of granules | Δ | ◯ | ◯ | ◎ | ◎ | ◎ |
| | D50 [mm] of granules | 1.0 | 2.0 | 2.0 | 2.0 | 2.0 | 2.0 |

In Ex. 51 to 56 wherein in 100 mass % of the glass raw material composition, at least 1 mass % of alumina cement (A1) and at least 1 mass % of calcium hydroxide were contained, granules were formed. In particular, rigid granules were formed within such a range that in the glass raw material composition, the content of alumina cement (A1) was at least 2 mass % and the content of calcium hydroxide was at least 1 mass %, and more rigid granules were formed within such a range that the content of alumina cement (A1) was at least 5 mass % and the content of calcium hydroxide was at least 1 mass %.

Further, in comparison of the results of Table 5 and the results of Table 7, for example, when Ex. 21 and Ex. 54 are compared, it is seen that when the content of alumina cement (A1) and the content of calcium hydroxide are substantially equal to each other, the rigidity of granules can be improved by carrying out the preliminary hydration step.

<Production of Glass Product>

For example, by charging and melting granules obtained in Ex. 1 or 2 in a glass melting furnace maintained at about 1,550° C., a glass melt is obtainable. Further, by forming and annealing the obtained glass melt, a glass product such as a glass plate is obtainable.

INDUSTRIAL APPLICABILITY

According to the method for producing granules of the present invention, it is possible to produce hardly breakable rigid granules as raw material for the production of alkali-free glass, and by using the granules, it is possible to produce a glass product of alkali-free glass with high quality wherein the homogeneity of the glass composition is excellent.

This application is a continuation of PCT Application No. PCT/JP2014/073036, filed on Sep. 2, 2014, which is based upon and claims the benefit of priority from Japanese Patent Application No. 2013-184369 filed on Sep. 5, 2013. The contents of those applications are incorporated herein by reference in their entireties.

REFERENCE SYMBOLS

S1: glass melting step
S2: forming step
S3: annealing step
S4: post-processing step
G5: glass product

What is claimed is:

1. A method for producing granules to be used for the production of alkali-free glass, the method comprising:
mixing a glass raw material composition and water, wherein the glass raw material composition comprises:
calcium oxide and/or calcium hydroxide,
$CaO.2Al_2O_3$, and
a silicon source.

2. The method for producing granules according to claim 1, wherein the glass raw material composition further comprises $CaO.Al_2O_3$.

3. The method for producing granules according to claim 1, wherein the glass raw material composition comprises, as a refining agent or a color tone adjuster, a sulfate component and/or a nitrate component.

4. The method for producing granules according to claim 1, wherein the glass raw material composition comprises the $CaO.2Al_2O_3$ in alumina cement, the alumina cement having an $Al_2O_3$ content of at least 65 mass %.

5. The method for producing granules according to claim 4, wherein the alumina cement comprises a calcium aluminate, the calcium aluminate comprising the $CaO.2Al_2O_3$ and $CaO.Al_2O_3$ in a total amount of from 80 to 100 mass % based on a total amount of the calcium aluminate in the alumina cement, and wherein the $CaO.2Al_2O_3$ is present in the alumina cement in an amount of from 2 to 100 mass % based on the total amount of $CaO.2Al_2O_3$ and $CaO.Al_2O_3$ in the alumina cement.

6. The method for producing granules according to claim 4, further comprising granulating the glass raw material composition by adding the calcium oxide and/or calcium hydroxide and the silicon source to a hydrate of the alumina cement, and mixing.

7. The method for producing granules according to claim 4, wherein the alumina cement having an $Al_2O_3$ content of at least 65 mass % consists essentially of the $CaO.2Al_2O_3$ and $CaO.Al_2O_3$.

8. The method for producing granules according to claim 4, wherein the alumina cement has an $Al_2O_3$ content of at least 90 mass % and further comprises $CaO.6Al_2O_3$.

9. The method for producing granules according to claim 4, wherein the alumina cement is present in the glass raw material composition in an amount of from 1 to 20 mass %.

10. The method for producing granules according to claim 1, further comprising, while mixing the glass material composition and water, hardening the composition such that granules are obtained at a temperature of at most 800° C.

11. The method for producing granules according to claim 1, wherein a total amount of calcium oxide and calcium hydroxide in the glass raw material composition is from 0.1 to 10 mass %.

12. The method for producing granules according to claim 1, wherein the glass raw material composition comprises boron oxide and/or boric acid in a total amount of from 0 mass % to at most 3 mass %.

13. The method for producing granules according to claim 1, wherein the alkali-free glass comprises from 40 to 85 mass % of $SiO_2$, from 5 to 30 mass % of $Al_2O_3$, from 0 to 18 mass % of MgO and from 2 to 40 mass % of CaO.

14. A method for producing a glass product, comprising:
    obtaining granules by the method as defined in claim 1,
    heating the granules to obtain a glass melt, and
    forming and annealing the glass melt to obtain the glass product.

15. The method for producing granules according to claim 1, wherein the glass raw material composition does not contain boron oxide or boric acid.

* * * * *